(12) United States Patent
Niwa

(10) Patent No.: US 12,480,668 B2
(45) Date of Patent: Nov. 25, 2025

(54) AIR CONDITIONER

(71) Applicant: FUJITSU GENERAL LIMITED, Kanagawa (JP)

(72) Inventor: Tomoaki Niwa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 15 days.

(21) Appl. No.: 18/682,027

(22) PCT Filed: Jul. 13, 2022

(86) PCT No.: PCT/JP2022/027490
§ 371 (c)(1),
(2) Date: Feb. 7, 2024

(87) PCT Pub. No.: WO2023/062900
PCT Pub. Date: Apr. 20, 2023

(65) Prior Publication Data
US 2025/0123010 A1    Apr. 17, 2025

(30) Foreign Application Priority Data

Oct. 14, 2021   (JP) ................. 2021-168941

(51) Int. Cl.
*F24F 13/24*   (2006.01)
*F24F 1/027*   (2019.01)
(Continued)

(52) U.S. Cl.
CPC ............... *F24F 1/58* (2013.01); *F24F 13/24* (2013.01); *F24F 1/027* (2013.01); *F24F 1/031* (2019.02)

(58) Field of Classification Search
CPC .... F24F 1/46; F24F 1/027; F24F 1/031; F24F 13/24
See application file for complete search history.

(56) References Cited

U.S. PATENT DOCUMENTS 3,289,423 A * 12/1966 Berner .................. F17C 13/086
                                                      220/62.19
5,295,903 A *  3/1994 Bolton .................... F24F 1/027
                                                        454/203
(Continued)

FOREIGN PATENT DOCUMENTS

CN   211667923 U   10/2020
JP   H03-017080 U   2/1991
(Continued)

*Primary Examiner* — Lionel Nouketcha
(74) *Attorney, Agent, or Firm* — Paratus Law Group, PLLC

(57) ABSTRACT

An air conditioner includes an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space. The outside casing is fitted in a wall communication hole and has an inside space in which the outdoor unit is capable of being disposed, the wall communication hole being formed in the building wall, the wall communication hole communicating between the outdoor space and the indoor space. The inside space is opened to the outdoor space. The outdoor unit is disposed in the inside space of the outside casing. A thermal insulation material is disposed in the inside space of the outside casing, and a space is formed between the outside casing and the thermal insulation material.

6 Claims, 9 Drawing Sheets

(51) Int. Cl.
*F24F 1/031* (2019.01)
*F24F 1/58* (2011.01)

(56) References Cited

U.S. PATENT DOCUMENTS

| | | | |
|---|---|---|---|
| 10,352,594 B2 | 7/2019 | D'Souza et al. | |
| 10,508,818 B2 * | 12/2019 | Xu | F24F 1/027 |
| 11,137,201 B2 * | 10/2021 | Jung | F25D 23/085 |
| 2020/0064017 A1 * | 2/2020 | Jewell | F24F 13/20 |
| 2023/0114621 A1 | 4/2023 | Aoki et al. | |

FOREIGN PATENT DOCUMENTS

| | | | | |
|---|---|---|---|---|
| JP | 3113360 U | 9/2005 | | |
| WO | WO-2016092669 A1 * | 6/2016 | ............. | F24F 13/20 |
| WO | WO 2021/187440 A1 | 9/2021 | | |

* cited by examiner

AIR CONDITIONER

CROSS REFERENCE TO PRIOR APPLICATION

This application is a National Stage Patent Application of PCT International Patent Application No. PCT/JP2022/027490 (filed on Jul. 13, 2022) under 35 U.S.C. § 371, which claims priority to Japanese Patent Application No. 2021-168941 (filed on Oct. 14, 2021), which are all hereby incorporated by reference in their entirety.

TECHNICAL FIELD

The present invention relates to an air conditioner that is installed in a wall communication hole formed in a wall that partitions an outdoor space and an indoor space.

BACKGROUND ART

Among air conditioners, there is an air conditioner called packaged terminal air conditioner (PTAC). The air conditioner is installed in a wall communication hole formed in a wall that partitions an outdoor space and an indoor space. When installing the air conditioner in the wall communication hole, the air conditioner is installed inside a casing (hereinafter, referred to as an outside casing) formed to have a size corresponding to a wall communication hole prepared separate from the air conditioner, i.e., the air conditioner is installed in the wall communication hole via the outside casing (e.g., see Patent Literature 1).

CITATION LIST

Patent Literature

Patent Literature 1: U.S. Pat. No. 10,352,594

DISCLOSURE OF INVENTION

Technical Problem

In the above-mentioned air conditioner, a part of the outside casing is disposed in a location where it is exposed to the indoor air while the other part is disposed in a location where it is exposed to the outdoor air. Thus, in a winter season, the part of the outside casing exposed to the indoor air as well as the part of the outside casing exposed to the outdoor air are cooled by the outdoor air. Therefore, in the part of the outside casing exposed to the indoor air, condensation occurs due to a temperature difference between the indoor air and the outdoor space.

A possible method of preventing the condensation is a method of providing a thermal insulation material on an inner wall of the outside casing. However, the dimensions of the wall communication hole provided in the wall are regulated by the standards. Therefore, if the thermal insulation material is made thicker in order to sufficiently suppress the condensation, the inside capacity of the outside casing decreases because of the thermal insulation material, and a problem in that the air conditioner cannot be installed inside the outside casing can occur. On the other hand, if the thermal insulation material is made thinner, sufficient thermal insulation properties between the indoor space and the inside of the outside casing cannot be secured, and thus the occurrence of the condensation in the part of the outside casing exposed to the indoor air cannot be suppressed.

In view of the above-mentioned circumstances, it is an objective of the present invention to provide an air conditioner with sufficient thermal insulation performance.

Solution to Problem

In order to accomplish the above-mentioned objective, an air conditioner according to an embodiment of the present invention includes an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space.

The outside casing is fitted in a wall communication hole and has an inside space in which the outdoor unit is capable of being disposed, the wall communication hole being formed in the building wall, the wall communication hole communicating between the outdoor space and the indoor space.

The inside space is opened to the outdoor space.

The outdoor unit is disposed in the inside space of the outside casing.

A thermal insulation material is disposed in the inside space of the outside casing.

A space is formed between the outside casing and the thermal insulation material.

With such an air conditioner, the outside casing has sufficient thermal insulation performance.

The air conditioner may further include a space forming member forming the space between the outside casing and the thermal insulation material.

With such an air conditioner, the outside casing has more sufficient thermal insulation performance.

In the air conditioner, the space forming member may have a separation wall and the separation wall may separate the area between the outside casing and the thermal insulation material into a plurality of spaces.

With such an air conditioner, the outside casing has more sufficient thermal insulation performance.

In the air conditioner, the space forming member may be disposed between a top wall that forms an upper surface of the outside casing and the thermal insulation material that is disposed under the top wall.

With such an air conditioner, the outside casing has more sufficient thermal insulation performance.

In the air conditioner, the top wall may have a first top wall that is disposed in the indoor space and a second top wall that is disposed from the wall communication hole to the outdoor space when the outside casing is fitted in the wall communication hole.

With such an air conditioner, the outside casing has more sufficient thermal insulation performance.

In the air conditioner, a partition member having thermal insulation properties may be disposed between the first top wall and the second top wall.

With such an air conditioner, the outside casing has more sufficient thermal insulation performance.

In the air conditioner, a part of the thermal insulation material may extend into at least one of the plurality of spaces of the space forming member.

With such an air conditioner, the outside casing has more sufficient thermal insulation performance.

In the air conditioner, a part of the thermal insulation material may extend into a space of the plurality of spaces formed between the first top wall and the thermal insulation material, the space being closest to the second top wall.

With such an air conditioner, the outside casing has more sufficient thermal insulation performance.

Advantageous Effects of Invention

As described above, in accordance with the present invention, an air conditioner with sufficient thermal insulation performance is provided.

MODE(S) FOR CARRYING OUT THE INVENTION

Hereinafter, an embodiment of the present invention will be described with reference to the drawings. Moreover, the same components or components having the same functions may be denoted by the same reference signs and descriptions of the components may be omitted as appropriate once the components are described. Moreover, numeric values described below are examples, and the present invention is not limited to those examples.
(Air Conditioner)

Figure 1:
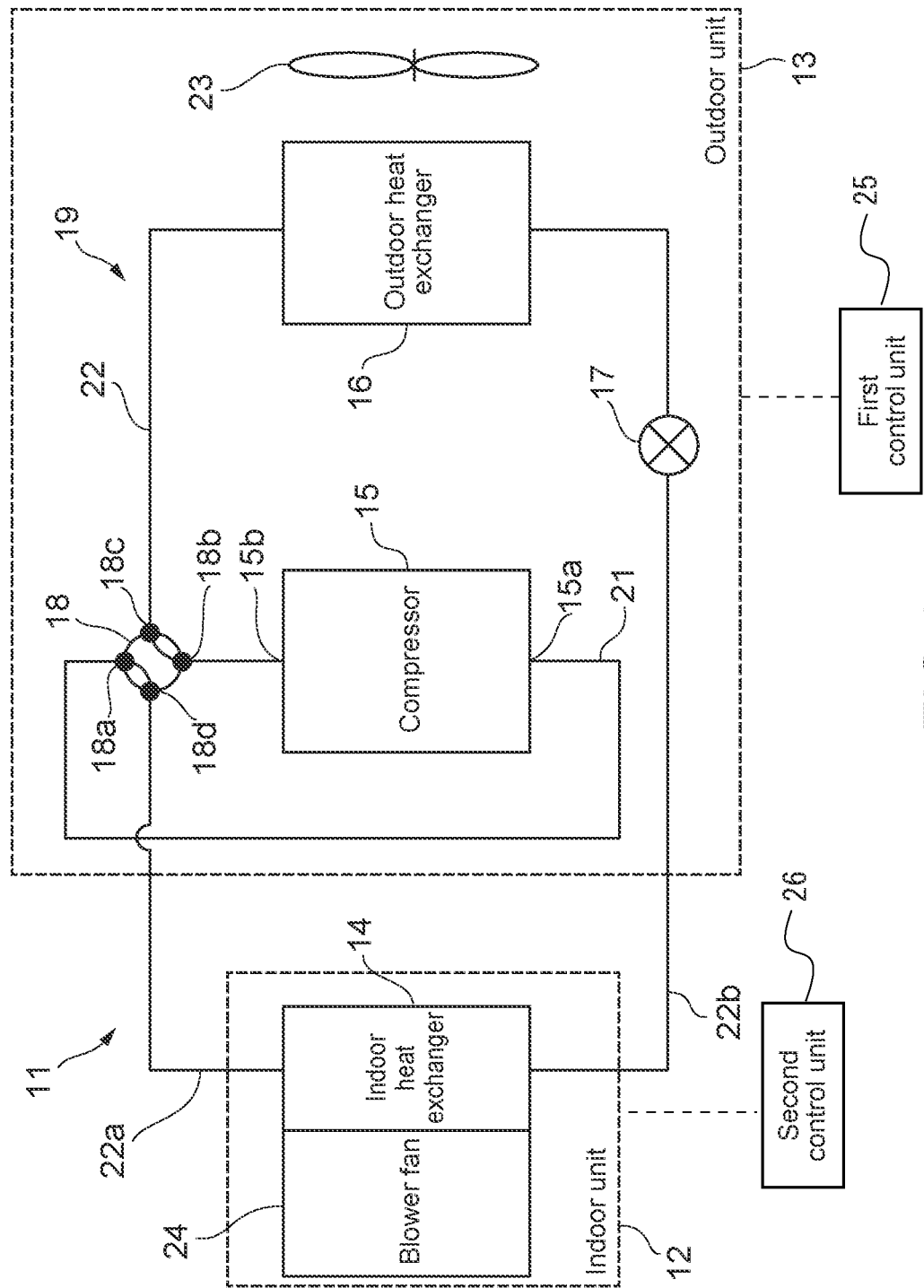
FIG. 1 A schematic block diagram showing an air conditioner according to the present embodiment.

FIG. 1 is a schematic block diagram showing an air conditioner according to the present embodiment.

An air conditioner 11 includes an indoor unit 12 and an outdoor unit 13. The indoor unit 12 is installed in an indoor space in a building, for example. The indoor unit 12 is fixed to a wall surface in the indoor space at a height of 2 meter or more from the floor in the indoor space, for example. The indoor unit 12 may be installed in a space corresponding to the indoor space. The indoor unit 12 has an indoor heat exchanger 14. The outdoor unit 13 has a compressor 15, an outdoor heat exchanger 16, an expansion valve 17, and a four-way valve 18. The indoor heat exchanger 14, the compressor 15, the outdoor heat exchanger 16, the expansion valve 17, and the four-way valve 18 form a refrigeration circuit (refrigerant circuit) 19. The outdoor heat exchanger 16 is connected to the indoor heat exchanger 14 through a refrigerant pipe. The outdoor unit 13 is controlled by a first control unit 25 and the indoor unit 12 is controlled by a second control unit 26. The first control unit 25 and the second control unit 26 transmit/receive signals to/from each other.

The refrigeration circuit 19 includes a first circulation path 21. The first circulation path 21 connects a first port 18a to a second port 18b of the four-way valve 18. The compressor 15 is disposed in the first circulation path 21. A suction pipe 15a of the compressor 15 is connected to the first port 18a of the four-way valve 18 via the refrigerant pipe. A gas refrigerant is supplied from the first port 18a to the suction pipe 15a of the compressor 15. The compressor 15 compresses the low-pressure gas refrigerant to a predetermined pressure. A discharge pipe 15b of the compressor 15 is connected to the second port 18b of the four-way valve 18 via a refrigerant pipe. A gas refrigerant is supplied from the discharge pipe 15b of the compressor 15 to the second port 18b of the four-way valve 18. The refrigerant pipe may be, for example, a copper pipe.

The refrigeration circuit 19 further includes a second circulation path 22. The second circulation path 22 connects a third port 18c to a fourth port 18d of the four-way valve 18. The outdoor heat exchanger 16, the expansion valve 17, and the indoor heat exchanger 14 are incorporated in the second circulation path 22 in order from the third port 18c side. The outdoor heat exchanger 16 exchanges heat energy between the refrigerant passing through the outdoor heat exchanger 16 and the air in contact with the outdoor heat exchanger 16. The indoor heat exchanger 14 exchanges heat energy between the refrigerant passing through the indoor heat exchanger 14 and the air in contact with the indoor heat exchanger 14. The second circulation path 22 includes a gas pipe 22a that is connected to the fourth port 18d of the four-way valve 18, is drawn from the outdoor unit 13, and extends toward the indoor heat exchanger 14, and a liquid pipe 22b that is connected to the expansion valve 17, is drawn from the outdoor unit 13, and extends toward the indoor heat exchanger 14.

A blower fan 23 is incorporated in the outdoor unit 13. The blower fan 23 sends the outdoor air to the outdoor heat exchanger 16. The blower fan 23 generates an air flow in accordance with rotation of an impeller, for example. The air flow passes through the outdoor heat exchanger 16 by the action of the blower fan 23. The outdoor air passes through the outdoor heat exchanger 16 and exchanges heat with a refrigerant. The heat-exchanged cold or warm air flow is blown out from the outdoor unit 13. The flow rate of the air flow passing through is adjusted in accordance with the rotation speed of the blower fan 23.

A blower fan 24 is incorporated in the indoor unit 12. The blower fan 24 sends the indoor air to the indoor heat exchanger 14. The blower fan 24 generates an air flow in accordance with rotation of an impeller. Indoor air is sucked into the indoor unit 12 by the action of the blower fan 24. The indoor air passes through the indoor heat exchanger 14 and exchanges heat with a refrigerant. The heat-exchanged cold or warm air flow is blown out from the indoor unit 12. The flow rate of the air flow passing through is adjusted in accordance with the rotation speed of the blower fan 24.

In the case where a cooling operation is performed in the refrigeration circuit 19, the four-way valve 18 connects the second port 18b and the third port 18c to each other and connects the first port 18a and the fourth port 18d to each other. Therefore, a high-temperature and high-pressure refrigerant is supplied from the discharge pipe 15b of the compressor 15 to the outdoor heat exchanger 16. The refrigerant flows through the outdoor heat exchanger 16, the expansion valve 17, and the indoor heat exchanger 14 in order. Heat is dissipated from the refrigerant to the outdoor air in the outdoor heat exchanger 16. The expansion valve 17 reduces the pressure of the refrigerant to a low pressure. The pressure-reduced refrigerant absorbs heat from the indoor air in the indoor heat exchanger 14. As a result, the indoor unit 12 generates cool air. The cool air is blown out into the indoor space by the action of the blower fan 24.

In the case where a heating operation is performed in the refrigeration circuit 19, the four-way valve 18 connects the second port 18b and the fourth port 18d to each other and connects the first port 18a and the third port 18c to each other. A high-temperature and high-pressure refrigerant is supplied from the compressor 15 to the indoor heat exchanger 14. The refrigerant flows through the indoor heat exchanger 14, the expansion valve 17, and the outdoor heat exchanger 16 in order. Heat is dissipated from the refrigerant to the surrounding air in the indoor heat exchanger 14. As a result, the indoor unit 12 generates warm air. The warm air is blown out into the indoor space by the action of the blower fan 24. The expansion valve 17 reduces the pressure of the refrigerant to a low pressure. The pressure-reduced refrigerant absorbs heat from the outdoor air in the outdoor heat exchanger 16. After that, the refrigerant returns to the compressor 15.

When the heating operation is performed for a long time and the temperature of the outdoor heat exchanger 16 reaches below the freezing point, for example, frost adheres to the outdoor heat exchanger 16 in some cases. Therefore, in the heating operation, a defrosting operation for removing frost from the outdoor heat exchanger 16 is periodically performed. In the case where the defrosting operation is performed in the refrigeration circuit 19, the four-way valve 18 connects the second port 18b to the third port 18c and connects the first port 18a to the fourth port 18d, similarly to the cooling operation. A high-temperature and high-pressure refrigerant is supplied from the discharge pipe 15b of the compressor 15 to the outdoor heat exchanger 16. The refrigerant flows through the outdoor heat exchanger 16, the expansion valve 17, and the indoor heat exchanger 14 in order. Heat is dissipated from the refrigerant to the outdoor air in the outdoor heat exchanger 16. The blower fan 23 and the blower fan 24 are stopped on the defrosting operation. As a result, frost adhered to the outdoor heat exchanger 16 melts, and this frost is defrosted from the outdoor heat exchanger 16. Further, since the defrosting operation is periodically performed during the heating operation, the heating operation may include the defrosting operation, and the defrosting operation and the heating operation may be collectively referred to as the heating operation.

Figure 2:
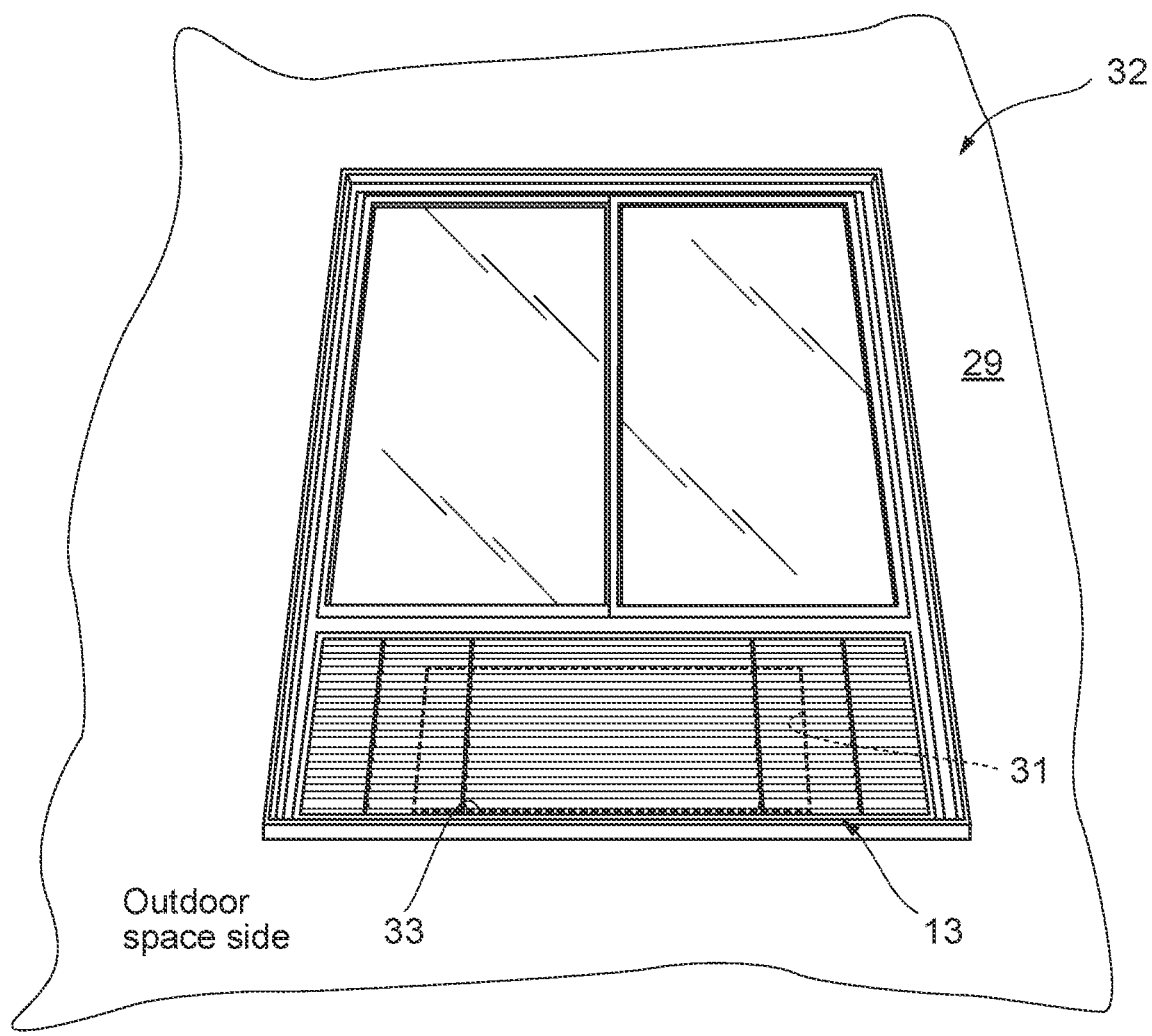
FIG. 2 A conceptual diagram schematically showing an outdoor unit observed in an outdoor space.
Figure 3:
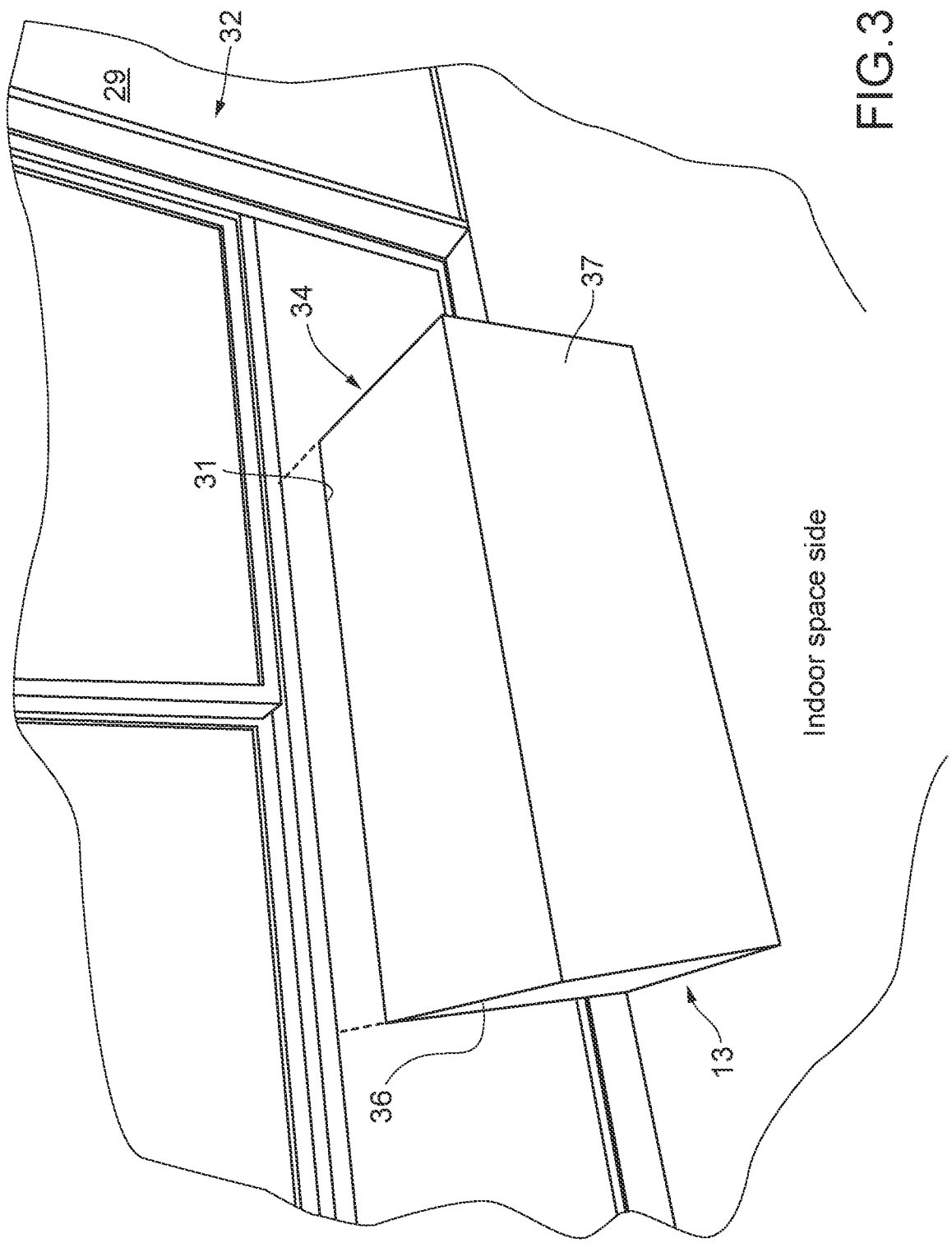
FIG. 3 A conceptual diagram schematically showing the outdoor unit observed in an indoor space.

FIG. 2 is a conceptual diagram schematically showing an outdoor unit observed in an outdoor space. FIG. 3 is a conceptual diagram schematically showing the outdoor unit observed in an indoor space.

The air conditioner 11 (FIG. 1) is attached to a building wall 29 that partitions the outdoor space and the indoor space. The air conditioner 11 includes an outside casing 34 for housing at least the outdoor unit 13. The outside casing 34 is fitted in a wall communication hole 31 formed in the building wall 29. The wall communication hole 31 is opened to the outdoor space (space outside the building) in an outer wall surface of a building 32. The wall communication hole 31 passes through the building wall 29 so as to put the outdoor space and the indoor space in communication with each other. The wall communication hole 31 is designed with dimensions regulated by the standards of PTAC. The outdoor unit 13 is installed in the outside casing 34 and an open port 33 is opened to the outdoor space. The indoor unit 12 may be installed in the outside casing 34 together with the outdoor unit 13. In this specification, an embodiment in which the outdoor unit 13 is installed in the outside casing 34 will be described.

(Outside Casing)

Figure 4:
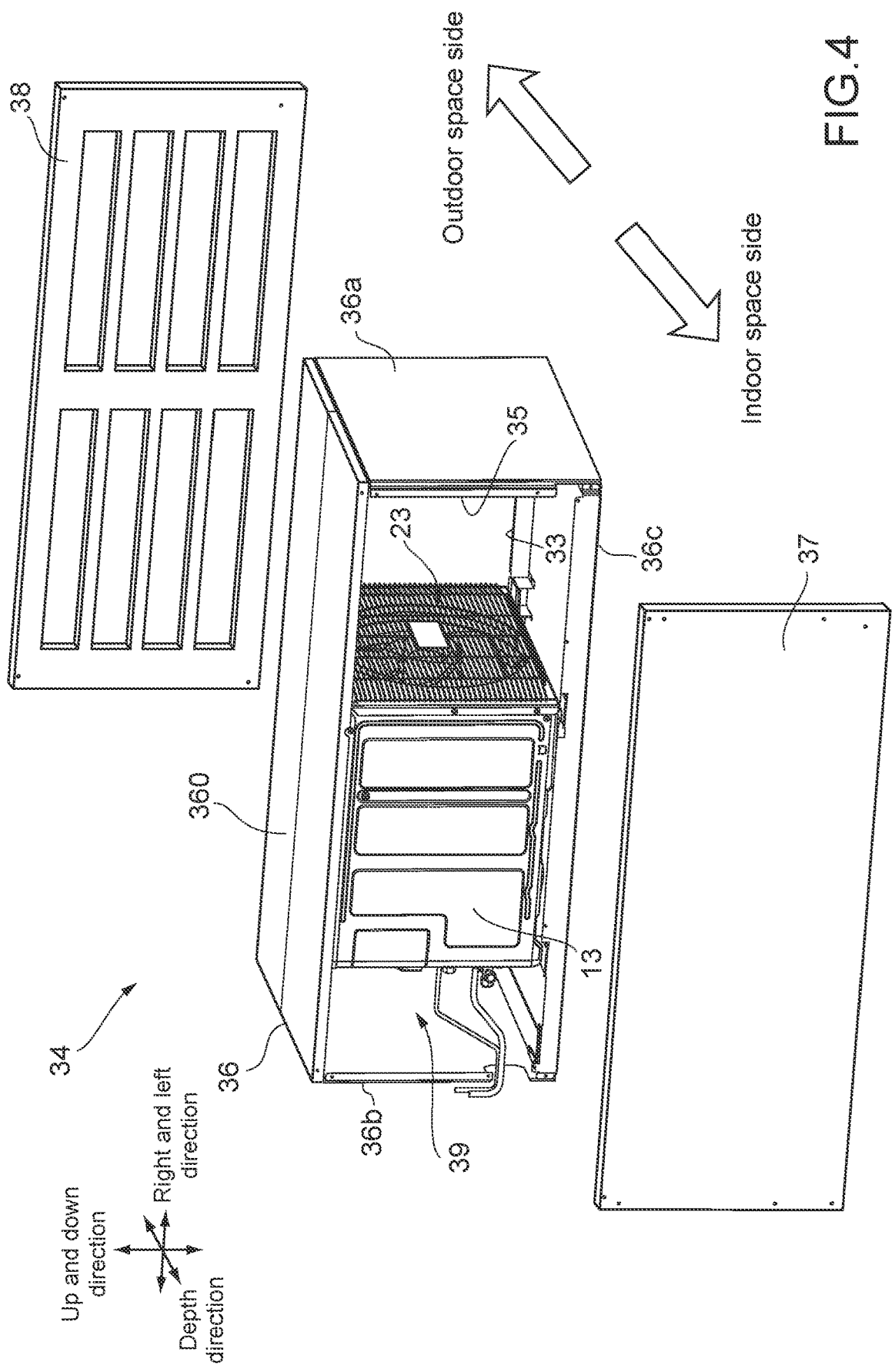
FIG. 4 An exploded perspective view conceptually showing an outside casing detached from a building wall and the outdoor unit installed in the outside casing.

FIG. 4 is an exploded perspective view conceptually showing an outside casing detached from a building wall and the outdoor unit installed in the outside casing.

The outside casing 34 defines an inside space 39 from the indoor space. The outside casing 34 isolates inside space 39 from the indoor space. The outside casing 34 includes a wall body 36, a front panel 37, and a grille 38. The outside casing 34 is, for example, formed of a sheet metal.

The wall body 36 has a storage port 35 opened toward the indoor space. The wall body 36 includes a first side wall (right side wall) 36a, a second side wall (left side wall) 36b, a bottom plate 36c, and a top wall 360. The first side wall 36a is disposed on a right end side of the wall communication hole 31 as viewed from the indoor space side. For example, the first side wall 36a is disposed substantially orthogonal to a wall surface of the building wall 29 (FIG. 2) on the right end side of the wall communication hole 31. The second side wall 36b is disposed on a left end side of the wall communication hole 31 as viewed from the indoor space side. For example, the second side wall 36b is disposed substantially orthogonal to the wall surface of the building wall 29 on the left end side of the wall communication hole 31. The bottom plate 36c is disposed orthogonal to the first side wall 36a and the second side wall 36b. The bottom plate 36c is coupled to a lower end of each of the first side wall 36a and the second side wall 36b. The top wall 360 is coupled to an upper end of each of the first side wall 36a and the second side wall 36b. The top wall 360 closes the inside space 39 of the outside casing 34 from above, which is sandwiched between the first side wall 36a and the second side wall 36b. The front panel 37 is coupled to the wall body 36. The front panel 37 closes the storage port 35. The grille 38 is installed in the open port 33 on a side opposite to the front panel 37.

When the outside casing 34 is assembled with the first side wall 36a, the second side wall 36b, the top wall 360, the bottom plate 36c, the front panel 37, and the grille 38, the first side wall 36a and the second side wall 36b forms side surfaces of the outside casing 34, the bottom plate 36c forms a lower surface of the outside casing 34, the top wall 360 forms an upper surface of the outside casing 34, the front panel 37 forms a front surface of the outside casing 34, and the grille 38 forms a rear surface of the outside casing 34.

Moreover, the outside casing 34 at least has the inside space 39 in which the outdoor unit 13 can be disposed. The inside space 39 is a space surrounded by the first side wall 36a, the second side wall 36b, the top wall 360, the bottom plate 36c, the front panel 37, and the grille 38. It should be noted that the right and left direction in FIG. 4 corresponds to a horizontal direction parallel to an indoor floor along the building wall 29 and the up and down direction corresponds to a perpendicular direction perpendicular to the indoor floor. The inside space 39 is defined by the outside casing 34 from the indoor space and opened to the outdoor space. It should be noted that the grille 38 may be embedded in an outer wall of the building 32 and in that case, the grille 38 may be omitted from the outside casing 34.

Figure 5:
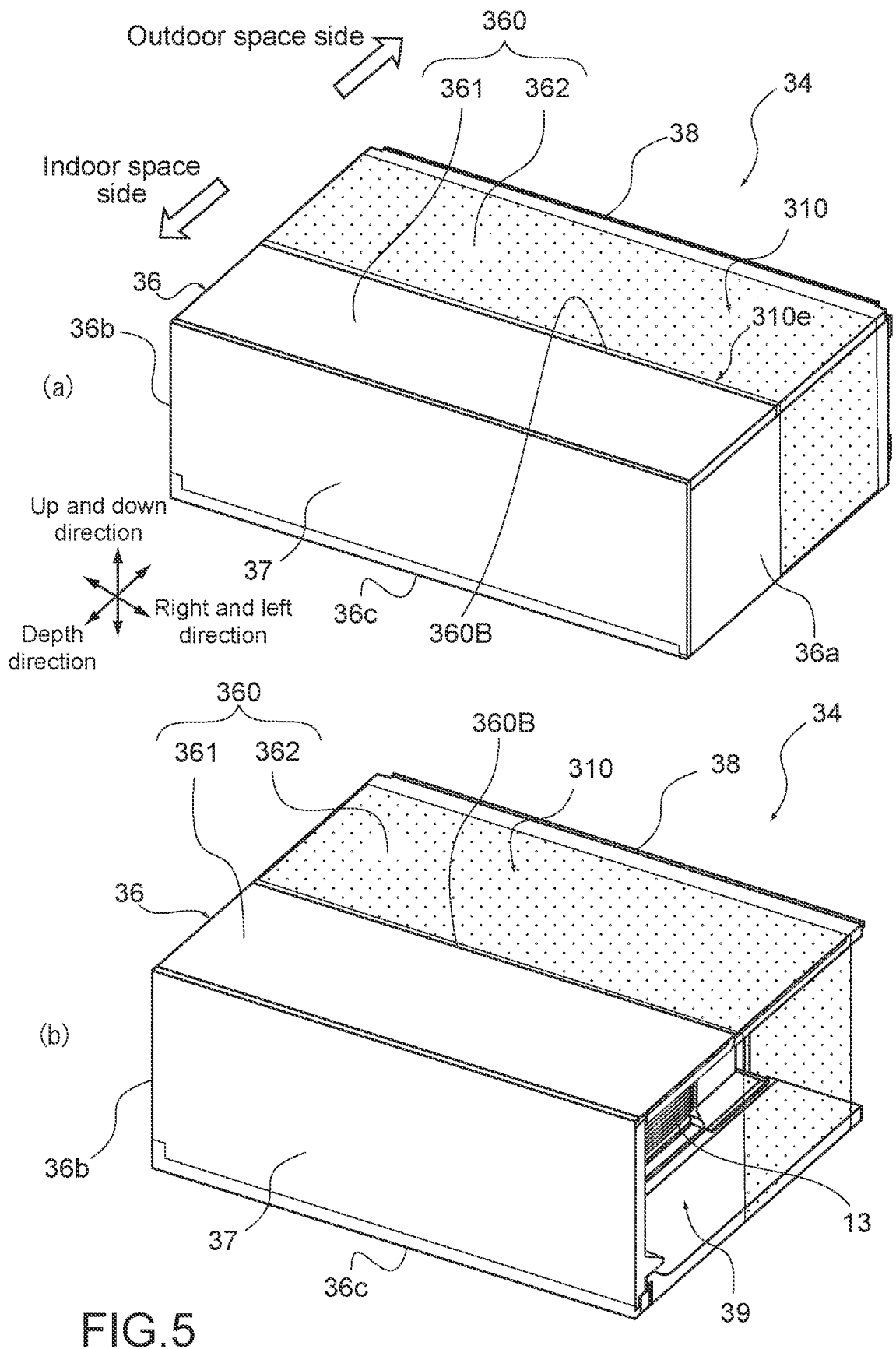
FIG. 5 Part (a) of the figure is a schematic perspective view showing a state in which the outside casing is fitted in a wall communication hole formed in a building wall. Moreover, Part (b) of the figure is a schematic perspective view showing an inside part of the outside casing after a first side wall and a grille are detached from the state of Part (a) of FIG. 5.

Part (a) of FIG. 5 is a schematic perspective view showing a state in which the outside casing 34 is fitted in the wall communication hole 31 formed in the building wall 29. Moreover, Part (b) of FIG. 5 is a schematic perspective view showing an inside part of the outside casing 34 after the first side wall 36a and the grille 38 are detached from the state of Part (a) of FIG. 5. Although the building wall 29 and the wall communication hole 31 shown in FIG. 3 are not shown in Part (a) and Part (b) of FIG. 5, a region 310 shown as dots corresponds to a region of the outside casing 34 fitted in the wall communication hole 31. In the region 310, the outside casing 34 faces an inner wall of the wall communication hole 31.

When the outside casing 34 is fitted in the wall communication hole 31, the top wall 360 of the outside casing 34 includes a first top wall 361 disposed in the indoor space and a second top wall 362 is disposed in the outdoor space from the wall communication hole 31 (the region 310). The first top wall 361 extends in the right and left direction. The second top wall 362 extends in the right and left direction. Each of the first top wall 361 and the second top wall 362 has the right and left direction as its longitudinal direction. The first top wall 361 and the second top wall 362 are arranged side by side in a depth direction (direction in which the front panel 37 and the grille 38 are opposite to each other). The first top wall 361 and the second top wall 362 are not in contact with each other.

The first top wall 361 is configured to be attachable and detachable in the outside casing 34. The position of a boundary 360B between the first top wall 361 and the second top wall 362 is aligned with, for example, an opening 310e of the wall communication hole 31 on the indoor space side. The position of the boundary 360B is not limited to the position coinciding with the opening 310e, and may be slightly shifted from the position of the opening 310e to the indoor space side or the outdoor space side.

Figure 6:
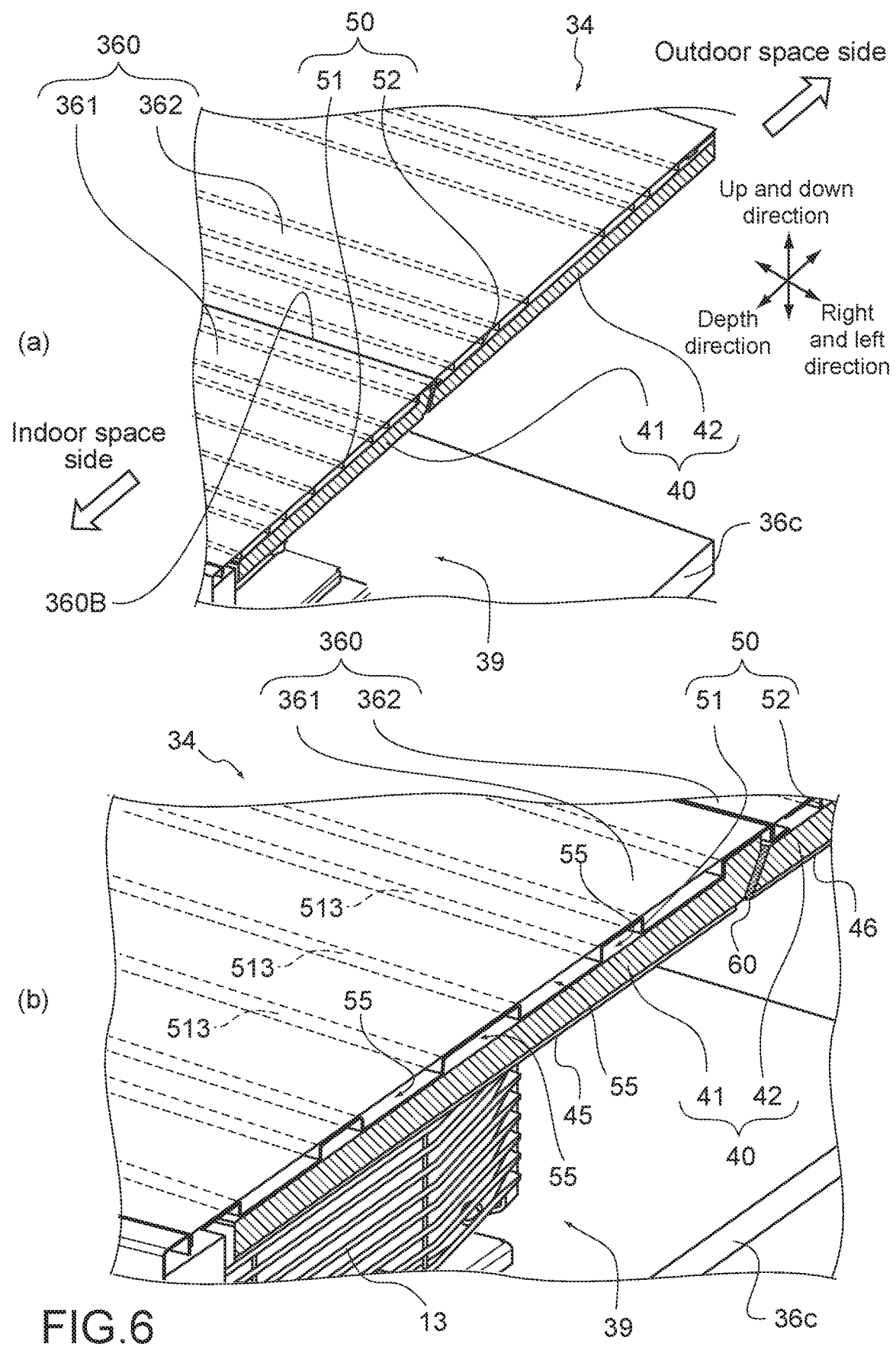
FIG. 6 Part (a) of the figure is a schematic perspective view showing the periphery of a right end portion of a top wall after the first side wall is removed from the outside casing. Part (b) of the figure is a schematic perspective view of an end portion of a first top wall shown in Part (a) of the figure in a further enlarged state.

Part (a) of FIG. 6 is a schematic perspective view showing the periphery of a right end portion of a top wall after the first side wall is removed from the outside casing. Part (b) of FIG. 6 is a schematic perspective view of an end portion of the first top wall shown in Part (a) of FIG. 6 in a further enlarged state.

The outside casing 34 includes a thermal insulation material 40 in addition to the wall body 36, the front panel 37, and the grille 38 described above. The thermal insulation material 40 is disposed in the inside space 39 of the outside casing 34. For example, the thermal insulation material 40 is disposed along the top wall 360 under the top wall 360. The thermal insulation material 40 is formed of a foamed polystyrene material, for example.

The thermal insulation material 40 includes a first thermal insulation material 41 that is disposed under the first top wall 361 and a second thermal insulation material 42 that is disposed under the second top wall 362. The first thermal insulation material 41 extends in the right and left direction and has the right and left direction as its longitudinal direction. The second thermal insulation material 42 extends in the right and left direction and has the right and left direction as its longitudinal direction. The first thermal insulation material 41 and the second thermal insulation material 42 are arranged side by side in the depth direction.

Moreover, in the outside casing 34, a space forming member 50 is disposed between the outside casing 34 and the thermal insulation material 40. The space forming member 50 is, for example, formed of a sheet metal. For example, the space forming member 50 is disposed between the top wall 360 of the outside casing 34 and the thermal insulation material 40 disposed under the top wall 360. By the space forming member 50 being disposed between the outside casing 34 and the thermal insulation material 40, a plurality of spaces 55 is formed between the outside casing 34 and the thermal insulation material 40. The plurality of spaces 55 is formed in such a manner that a gap between the outside casing 34 and the thermal insulation material 40 in the depth direction is separated by separation walls 513 included in the space forming member 50. The spaces 55 and the separation walls 513 extend in the right and left direction. It should be noted that the inside space 39 functions as a housing space for housing the air conditioner inside the outside casing 34 while the spaces 55 function as thermal insulation spaces for suppressing heat conduction to the top wall 360 from the inside space 39.

The space forming member 50 includes a first space forming member 51 that is disposed under the first top wall 361 and a second space forming member 52 that is disposed under the second top wall 362. The first space forming member 51 is disposed between the first top wall 361 and the first thermal insulation material 41. The second space forming member 52 is disposed between the second top wall 362 and the second thermal insulation material 42. The first space forming member 51 and the second space forming member 52 extend in the right and left direction and each have the right and left direction as its longitudinal direction. Moreover, the first space forming member 51 and the second space forming member 52 are arranged side by side in the depth direction. The space forming member 50 is fixed to the top wall 360 by a technique such as soldering. Moreover, the thermal insulation material 40 is fixed to the space forming member 50 or the top wall 360 with fixation members such as screws (not shown). In the up and down direction, the space forming member 50 is supported by the top wall 360 and the thermal insulation material 40 is supported by the space forming member 50 or the top wall 360. It should be noted that a metal foil 45 such as an aluminum foil for reinforcing the first thermal insulation material 41 is bonded to the first thermal insulation material 41 on a side opposite to the first top wall 361. A metal foil 46 such as an aluminum foil for reinforcing the second thermal insulation material 42 is bonded to the second thermal insulation material 42 on a side opposite to the second top wall 362. That is, in the outside casing 34, a stack body including the top wall 360, the space forming member 50, the thermal insulation material 40, and the metal foils 45 and 46 is formed.

Figure 7:
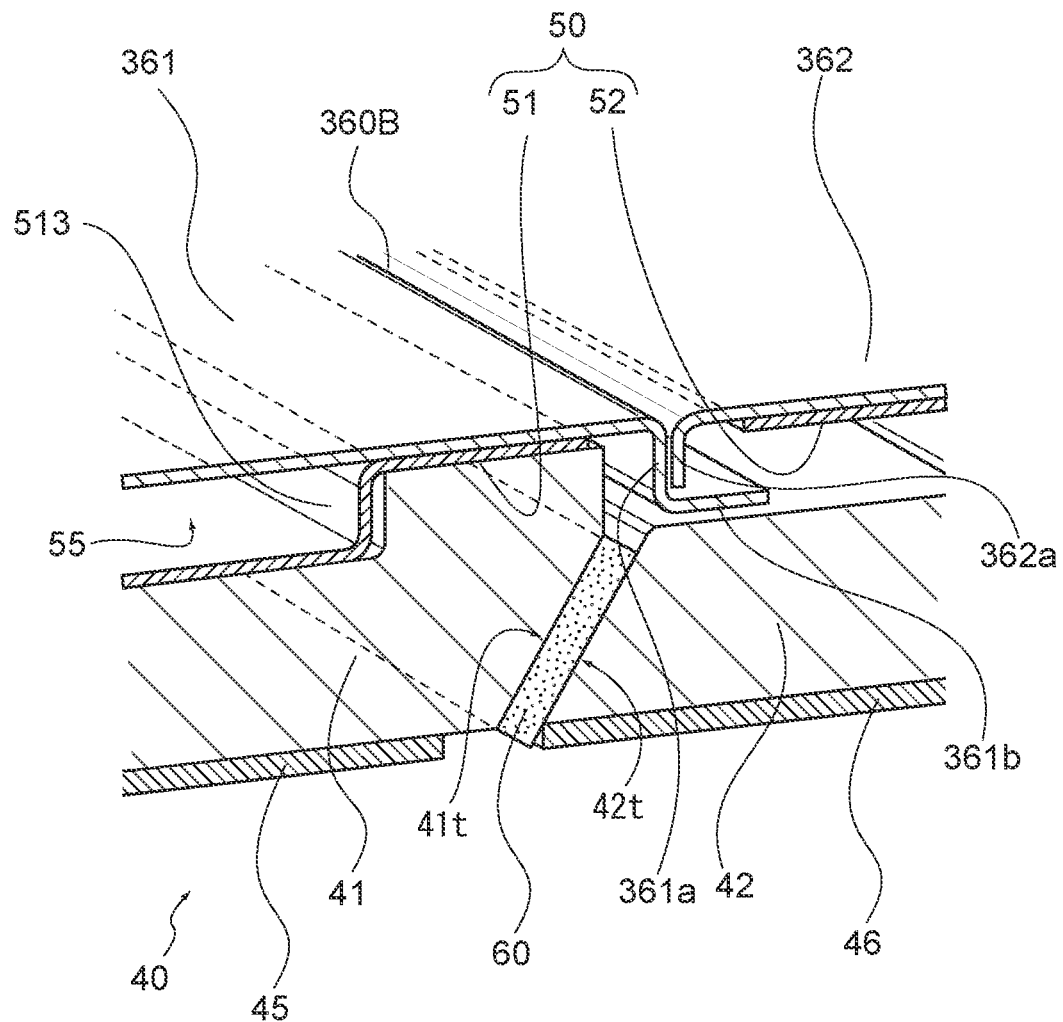
FIG. 7 A schematic perspective view of vicinity of a boundary between the first top wall and a second top wall of the outside casing in an enlarged state.

FIG. 7 is a schematic perspective view of vicinity of a boundary between the first top wall and the second top wall of the outside casing in an enlarged state. An end surface of the first thermal insulation material 41 and an end surface of the second thermal insulation material 42 face each other and each of the end surfaces is a tilt surface. A tilt surface 42t of the second thermal insulation material 42 is formed to tilt upwards toward the second thermal insulation material 42 from the first thermal insulation material 41. A tilt surface 41t of the first thermal insulation material 41 is formed in a shape facing the tilt surface 42t. An elastic body 60 is disposed between the tilt surface 41t and the tilt surface 42t. The elastic body 60 is held in contact with each of the first thermal insulation material 41 and the second thermal insulation material 42. For example, the elastic body 60 is adhered to the second thermal insulation material 42. The first thermal insulation material 41 is merely held in contact with the elastic body 60 and not adhered thereto. The elastic body 60 extends in the right and left direction along the tilt surface 41t and the tilt surface 42t. With the configuration in which the elastic body 60 is sandwiched between the first thermal insulation material 41 and the second thermal insulation material 42 and extends in the right and left direction along the tilt surface 41t and the tilt surface 42t, flowing of the outdoor air into the spaces 55 through a gap between the first thermal insulation material 41 and the second thermal insulation material 42 is suppressed, and thermal insulation properties between the indoor space and the inside space 39 of the outside casing 34 are secured.

It should be noted that the first top wall 361 includes a bent portion 361a that is formed bent downward in vicinity of the boundary 360B and an extension portion 361b that is formed by bending an end portion of the bent portion 361a to the outdoor space side. The second top wall 362 has a bent portion 362a that is formed bent downward in vicinity of the boundary 360B. The bent portion 361a of the first top wall 361 and the bent portion 362a of the second top wall 362 face each other in the depth direction, but they do not come into contact with each other. The extension portion 361b of the first top wall 361 passes under the bent portion 362a of the second top wall 362 and extends to the outdoor space side.

Figure 8:
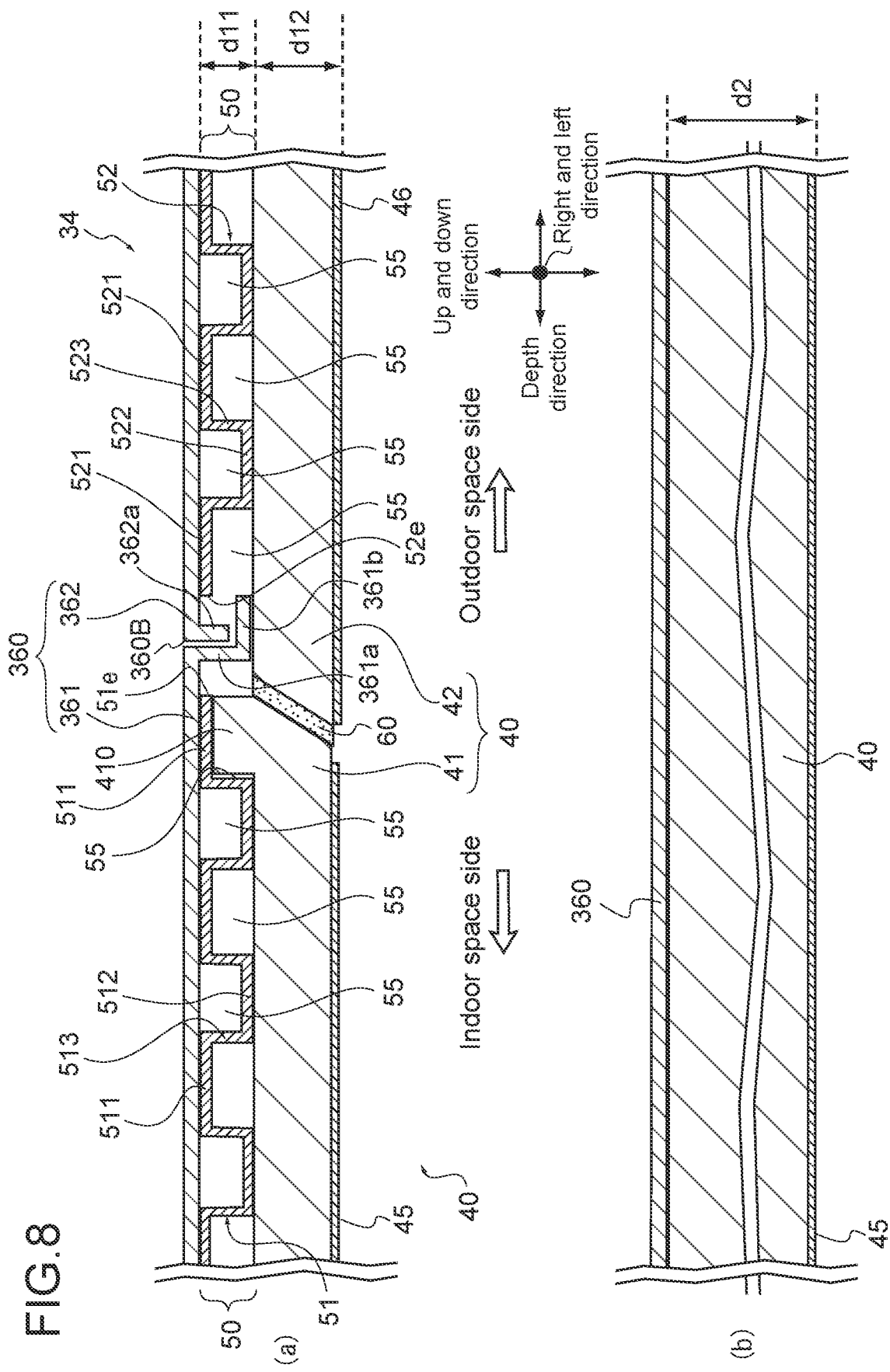
FIG. 8 Part (a) of the figure is a schematic cross-sectional view of a stack body including a top wall, a space forming member, and a thermal insulation material. Part (b) of the figure is a schematic cross-sectional view of a top wall and a thermal insulation material according to a comparative example.

Part (a) of FIG. 8 is a schematic cross-sectional view of a stack body including the top wall 360, the space forming member 50, and the thermal insulation material 40. Part (a) of FIG. 8 shows a cross-section as the outside casing 34 is cut in a virtual plane formed by the up and down direction and the depth direction. Moreover, Part (b) of FIG. 8 is a schematic cross-sectional view of a top wall and a thermal insulation material according to a comparative example. In the comparative example, the space forming member 50 is not used.

The first space forming member 51 includes a plurality of the plate portions 511, a plurality of plate portions 512, and the plurality of separation walls 513. The first space forming member 51 is formed of a single sheet metal and the plate portions 511, the plate portions 512, and the separation walls 513 are formed by bending the sheet metal in the depth direction in a rectangle shape multiple times. The plate portions 511 are held in contact with the first top wall 361. The plate portions 511 are fixed to the first top wall 361 by a technique such as soldering. The plate portions 512 are held in contact with the first thermal insulation material 41. The separation walls 513 are connected to the plate portions 511 and the plate portions 512. The plurality of the plate portions 511 is arranged side by side in the depth direction. The plurality of plate portions 512 is arranged side by side in the depth direction. As the first space forming member 51 is viewed from the first top wall 361 in a see-through manner, the plate portions 511 are disposed between the plate portions 512 adjacent to each other and the plate portions 512 are disposed between the plate portions 511 adjacent to each other. The separation walls 513 extend between the plate portions 511 and the plate portions 512 in the up and down direction. By repeatedly disposing those components in the depth direction in the order of the plate portion 511, the separation wall 513, the plate portion 512, and the separation wall 513, the cross-sectional shape of the first space forming member 51 becomes a rectangular wave shape.

In the first space forming member 51, the respective parts of the first space forming member 51 and the first side wall 36a and the second side wall 36b of the outside casing 360 form a plurality of spaces 55. The separation walls 513 adjacent to each other in the depth direction, the plate portions 511 disposed between the separation walls 513 adjacent to each other, and the first thermal insulation material 41 form a plurality of spaces 55. Moreover, the separation walls 513 adjacent to each other in the depth direction, the plate portions 512 disposed between the separation walls 513 adjacent to each other, and the first top wall 361 form a plurality of spaces 55. Furthermore, in an end portion 51e of the first space forming member 51 in which the first space forming member 51 faces the second space forming member 52, the plate portion 511 that forms the end portion 51e, the separation wall 513 connected to the plate portion 511 that forms the end portion 51e, the bent portion 361a of the first top wall 361, the first thermal insulation material 41, and the second thermal insulation material 42, and the elastic body 60 form a space 55. It should be noted that in the example of Part (a) of FIG. 8, a part of the first thermal insulation material 41 (a partition member 410 to be described later) extends in the space 55 formed in the end portion 51e.

Moreover, the second space forming member 52 includes a plurality of plate portions 521, a plurality of plate portions 522, and a plurality of separation walls 523. The second space forming member 52 is formed of a single sheet metal and the plate portions 521, the plate portions 522, and the separation walls 523 are formed by bending the sheet metal in the depth direction in a rectangle shape multiple times. The plate portions 521 are held in contact with the second top wall 362. The plate portions 521 are fixed to the second top wall 362 by a technique such as soldering or screwing. The plate portions 522 are held in contact with the second thermal insulation material 42. The separation walls 523 are connected to the plate portions 521 and the plate portions 522. The plurality of plate portions 521 is arranged side by side in the depth direction. The plurality of plate portions 522 is arranged side by side in the depth direction. As the second space forming member 52 is viewed from the second top wall 362 in a see-through manner, the plate portions 521 are disposed between the plate portions 522 adjacent to each other and the plate portions 522 are disposed between the plate portions 521 adjacent to each other. The separation walls 523 extend between the plate portions 521 and the plate portions 522 in the up and down direction. By repeatedly disposing those components in the depth direction in the order of the plate portion 521, the separation wall 523, the plate portion 522, and the separation wall 523, the cross-sectional shape of the second space forming member 52 becomes a rectangular wave shape.

In the second space forming member 52, the respective parts of the second space forming member 52 and the first side wall 36a and the second side wall 36b of the outside casing 360 form a plurality of spaces 55. The separation walls 523 adjacent to each other in the depth direction, the plate portions 521 disposed between the separation walls 523 adjacent to each other, and the second thermal insulation material 42 form a plurality of spaces 55. Moreover, the separation walls 523 adjacent to each other in the depth direction, the plate portions 522 disposed between the separation walls 523 adjacent to each other, and the second top wall 362 form a plurality of spaces 55. Furthermore, in an end portion 52e of the second space forming member 52 in which the second space forming member 52 faces the first space forming member 51, the plate portion 521 that forms the end portion 52e, the separation walls 523 connected to the plate portion 521 that forms the end portion 52e, the bent portion 362a of the second top wall 362, the extension portion 361b of the first top wall 361, and the second thermal insulation material 42 form a space 55.

In the outside casing 34, the partition member 410 that is a part of the thermal insulation material 41 extends into at least one of the plurality of spaces 55. For example, as shown in Part (a) of FIG. 8, the partition member 410 extends into the space 55 closest to the second top wall 362 among the plurality of spaces 55 formed between the first top wall 361 and the first thermal insulation material 41, i.e., the space 55 formed by the plate portion 511 that forms the end portion 51e, the separation wall 513 connected to the plate portion 511 that forms the end portion 51e, and the bent portion 361a of the first top wall 361.

It should be noted that the thermal insulation material 40 and the space forming member 50 which have been described above are not limited to the top wall 360, and may be provided in at least either one of the first side wall 36a and the second side wall 36b in the inside space 39.

Before describing actions of the air conditioner 11 according to the present embodiment, actions of the comparative example shown in Part (b) of FIG. 8 will be described.

In the air conditioner attached to the building wall 29 via the outside casing, the inside space of the outside casing is cooled by the outdoor air in a winter season. Therefore, in the portion of the outside casing which is exposed to the indoor air shown in FIG. 3, condensation occurs due to a temperature difference between the indoor air and the outdoor space. A possible method of preventing this condensation is providing the inner wall of the outside casing with the thermal insulation material 40.

Here, in the structure in which the space forming member 50 is not provided between the top wall 360 and the thermal insulation material 40 as in the comparative example shown in Part (b) of FIG. 8, it is necessary to set a thickness d2 of the thermal insulation material 40 to be a thickness that can suppress the occurrence of the condensation in the portion of the outside casing which is exposed to the indoor air.

However, the size of the wall communication hole 31 formed in the building wall 29 is regulated by the standards. Therefore, also the size of the outside casing fitted in the wall communication hole 31 is regulated by the standards of the wall communication hole 31. Thus, if the thickness of the thermal insulation material 40 increases, the capacity of the inside space of the outside casing decreases. Therefore, when inserting the outdoor unit 13 into the outside casing 34, the upper portion of the outdoor unit 13 can come into contact with the thermal insulation material 40 because of the thickness of the thermal insulation material 40. Thus, in the comparative example, the installation property to install the air conditioner in the outside casing is affected. Moreover, if the thermal insulation material 40 is made thinner, the installation property for the air conditioner is improved, but sufficient thermal insulation properties between the indoor space and the inside space of the outside casing cannot be secured.

In this regard, in the outside casing 34 in Part (a) of shown in FIG. 8, the spaces 55 are provided between the top wall 360 and the thermal insulation material 40 by the use of the space forming member 50. In this manner, an air layer having lower heat conductivity than that of the thermal insulation material 40 is formed between the outside casing 34 and the thermal insulation material 40. As a result, the thickness of the thermal insulation material 40 can be set to be thinner than in the comparative example. In addition, since the space forming member 50 is disposed between the top wall 360 and the thermal insulation material 40, the space forming member 50 is not directly exposed to the outdoor air in the inside space 39. As a result, in each space 55 of the space forming member 50, the temperature difference in the up and down direction is reduced, and the air convection in the up and down direction does not easily occur in each space 55. Thus, sufficient thermal insulation properties between the indoor space and the inside space 39 of the outside casing 34 are secured. For example, in the comparative example shown in Part (b) of FIG. 8, in order to secure sufficient thermal insulation properties between the indoor space and the inside space 39 of the outside casing 34, 30 mm is required as the thickness d2 of the thermal insulation material 40. Meanwhile, in Part (a) of shown in FIG. 8 in the present embodiment, the same thermal insulation effect as the thermal insulation material with the thickness of 30 mm is obtained with a thermal insulation layer with a total thickness of 23 mm (a thickness d12 of the thermal insulation material 40 is 15 mm and a thickness d11 of the space forming member 50 (thickness of the air layer) is 8 mm).

As described above, the thickness d2 of the thermal insulation material 40 is 30 mm in the comparative example shown in Part (b) of FIG. 8 while a total thickness (of the thermal insulation layer) of the thickness d11 of the space forming member 50 and the thickness d12 of the thermal insulation material 40 is 23 mm in Part (a) of shown in FIG. 8 in the present embodiment. Thus, in the present embodiment, the capacity for the outdoor unit 13 to be disposed in the inside space 39 is larger than in the comparative example, and the installation property in installing the air conditioner in the outside casing 34 is improved without reducing the thermal insulation effect.

Moreover, in the present embodiment, the separation walls 513 and 523 of the space forming member 50 separate the area between the outside casing 34 and the thermal insulation material 40 into the plurality of spaces 55. As a result, the air convection (e.g., air convection in the depth direction) is suppressed between the outside casing 34 and the thermal insulation material 40, and thermal insulation properties between the indoor space and the inside space 39 of the outside casing 34 are further secured. For example, in the present embodiment, the plurality of spaces 55 is defined below the first top wall 361 and the second top wall 362. As a result, heat conduction due to the air moving below the second top wall 362 closer to the outdoor space does not easily affect on the side of the first top wall 361. Moreover, in the present embodiment, if the space is further divided into the plurality of spaces 55 below each of the first top wall 361 and the second top wall 362, the heat conduction from the indoor and outdoor spaces the side to the indoor space side due to the air convection is suppressed.

Moreover, in the present embodiment, the space forming member 50 is disposed between the top wall 360 of the outside casing 34 and the thermal insulation material 40. For example, if the thermal insulation material 40 is detached and only the space forming member 50 is disposed under the top wall 360, the space forming member 50 is directly exposed to the outdoor air flowing into the inside space 39. In such a case, if the temperature difference in the up and down direction increases in each space 55 of the space forming member 50, the air convection occurs in the up and down direction in each space 55, and the outside casing 34 can be cooled. In this regard, since the thermal insulation material 40 is disposed under the space forming member 50 in the present embodiment, the space forming member 50 is not directly exposed to the outdoor air in the inside space 39. As a result, in each space 55 of the space forming member 50, the temperature difference in the up and down direction is reduced, and the air convection in the up and down direction does not easily occur in each space 55. As a result, thermal insulation properties between the indoor space and the inside space 39 of the outside casing 34 are further secured.

Moreover, while the top wall 360 does not have the divided structure in the comparative example, in the present embodiment, the top wall 360 is divided into the first top wall 361 disposed in the indoor space and the second top wall 362 disposed in the outdoor space from the wall communication hole 31. By setting the top wall 360 to have the divided structure, the first top wall 361 and the second top wall 362 are disposed so that the first top wall 361 and the second top wall 362 are not in contact with each other. In this manner, mutual heat conduction between the first top wall 361 and the second top wall 362 is suppressed, and heat does not easily escape into the second top wall 362 from the first top wall 361 disposed in the indoor space. As a result, the decrease in the temperature of the first top wall 361 is suppressed, and thermal insulation properties between the indoor space and the inside space 39 of the outside casing 34 are further secured.

Moreover, in the present embodiment, the part (partition member 410) of the thermal insulation material 40 extends into the at least one of the plurality of spaces 55 of the space forming member 50. For example, the part of the thermal insulation material 40 extends into the space 55 closest to the second top wall 362 among the plurality of spaces 55 formed by the first space forming member 51. As a result, mutual heat conduction between the first space forming member 51 and the second space forming member 52 is suppressed, and thus the mutual heat conduction between the first top wall 361 and the second top wall 362 is further suppressed. As a result, thermal insulation properties between the indoor space and the inside space 39 of the outside casing 34 are further secured.

Moreover, in the present embodiment, the boundary 360B between the first top wall 361 and the second top wall 362 is positioned at an open end 310e of the wall communication hole 31. As a result, the first top wall 361 can be easily attached to the outside casing 34 or easily detached from the outside casing 34 without being affected by the wall communication hole 31. Moreover, when the boundary 360B is extremely deviated on the indoor space side, the second top wall 362 is exposed in the indoor space, and condensation easily occurs on the second top wall 362 in the indoor space. Thus, it is favorable to locate the boundary 360B between the first top wall 361 and the second top wall 362 at the open end 310e of the wall communication hole 31.

Moreover, the elastic body 60 is provided between the first thermal insulation material 41 and the second thermal insulation material 42. The elastic body 60 functions as a wind-shielding material. For example, after the elastic body 60 is sandwiched between the first thermal insulation material 41 and the second thermal insulation material 42, the elastic body 60 is pressed from each of the first thermal insulation material 41 and the second thermal insulation material 42, such that the elastic body 60 is held in close contact with each of the first thermal insulation material 41 and the second thermal insulation material 42. Accordingly, flowing of the outdoor air into the spaces 55 through the gap between the first thermal insulation material 41 and the second thermal insulation material 42 is suppressed. As a result, thermal insulation properties between the indoor space and the inside space 39 of the outside casing 34 are further secured.

Figure 9:
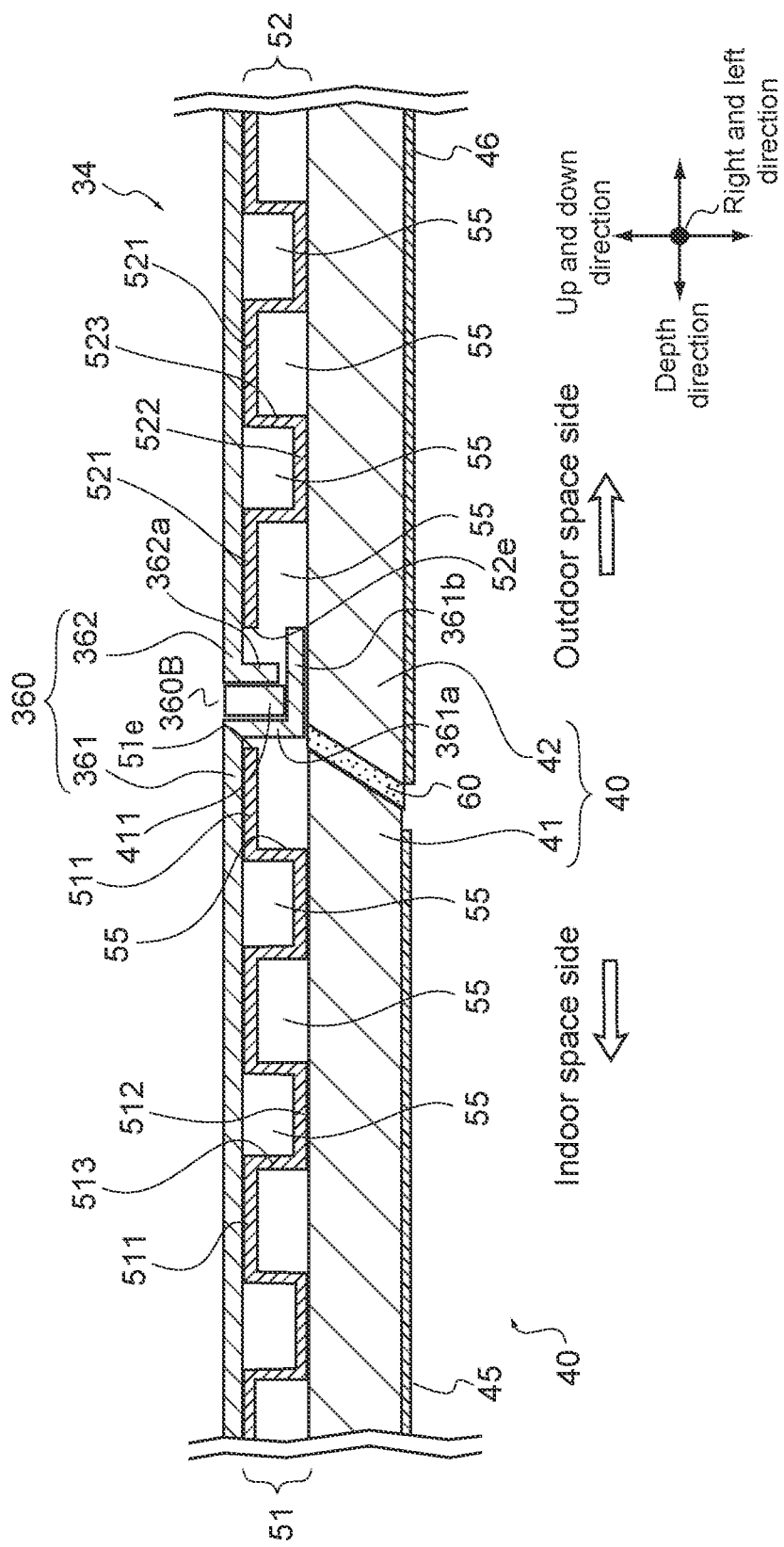
FIG. 9 A schematic cross-sectional view showing another example of a partition member.

FIG. 9 is a schematic cross-sectional view showing another example of the partition member. In addition to the partition member extending into any one space 55 as a part of the thermal insulation material 40, a partition member 411 may be disposed apart from the thermal insulation material 40 between the first top wall 361 and the second top wall 362. The partition member 411 has thermal insulation properties. The partition member 411 extends in the right and left direction. The material of the partition member 411 may be the same as the material of the partition member 410. By such a partition member 411 being disposed between the first top wall 361 and the second top wall 362, mutual heat conduction is suppressed. As a result, thermal insulation properties between the indoor space and the inside space 39 of the outside casing 34 are further secured.

Although the embodiment of the present invention has been described above, it goes without saying that the present invention is not limited to only the above-mentioned embodiment and various modifications can be made. The respective embodiments are not limited to the independent embodiments and can be combined with each other if technically possible.

REFERENCE SIGNS LIST 11 air conditioner
12 indoor unit
13 outdoor unit
14 indoor heat exchanger
15 compressor
15a suction pipe
15b discharge pipe
16 outdoor heat exchanger
17 expansion valve
18 four-way valve
18a first port
18b second port
18c third port
18d fourth port
19 refrigeration circuit
21 circulation path
22a gas pipe
22b liquid pipe
22 circulation path
23 blower fan
24 blower fan
25 control unit
26 control unit
29 building wall
31 wall communication hole
310 region
310e opening
32 building
33 open port
34 outside casing
35 storage port
36 wall body
360 top wall
360B boundary
361 first top wall
361a bent portion
361b extension portion
362 second top wall
362a bent portion
36a first side wall
36b second side wall
36c bottom plate 37 front panel
38 grille
39 inside space
40 thermal insulation material
41 first thermal insulation material
410, 411 partition member
42 second thermal insulation material
41t, 42t tilt surface
45, 46 metal foil
50 space forming member
51 first space forming member
51e end portion
511, 512 plate portion
513 separation wall
52 second space forming member
52e end portion
521, 522 plate portion
523 separation wall
55 space
60 elastic body

The invention claimed is:

1. An air conditioner that includes an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space, wherein the outside casing that includes a wall body, a thermal insulation material and a space forming member, the wall body being fitted in a wall communication hole and having an inside space in which the outdoor unit is capable of being disposed, the wall communication hole being formed in the building wall, the wall communication hole communicating between the outdoor space and the indoor space, the thermal insulation material disposed in the inside space of the wall body, the space forming member disposed between the wall body and the thermal insulation material, the inside space is opened to the outdoor space, the outdoor unit is disposed in the inside space of the outside casing, and the space forming member has a plurality of separation walls adjacent to each other in a depth direction from the outdoor space side toward the indoor space side, the separation walls defining a plurality of spaces adjacent to each other in the depth direction, between the wall body and the thermal insulation material.

2. The air conditioner according to claim 1, wherein the space forming member is disposed between a top wall that forms an upper surface of the outside casing and the thermal insulation material that is disposed under the top wall.

3. The air conditioner according to claim 2, wherein the top wall has a first top wall that is disposed in the indoor space and a second top wall that is disposed from the wall communication hole to the outdoor space when the outside casing is fitted in the wall communication hole.

4. The air conditioner according to claim 3, wherein a partition member having thermal insulation properties is disposed between the first top wall and the second top wall.

5. The air conditioner according to claim 1, wherein a part of the thermal insulation material extends into at least one of the plurality of spaces of the space forming member.

6. The air conditioner according to claim 3, wherein a part of the thermal insulation material extends into a space of the plurality of spaces formed between the first top wall and the thermal insulation material, the space being closest to the second top wall.

* * * * *